United States Patent
Morgan

[11] 3,809,027
[45] May 7, 1974

[54] INTERNAL COMBUSTION ENGINE
[75] Inventor: Edward J. Morgan, Fond du Lac, Wis.
[73] Assignee: Brunswick Corporation, Chicago, Ill.
[22] Filed: Feb. 28, 1972
[21] Appl. No.: 229,738

[52] U.S. Cl............. 123/30 R, 123/32 R, 123/32 C, 123/32 SP, 123/33 C, 123/32 ST
[51] Int. Cl............................................. F02b 15/00
[58] Field of Search .... 123/30 R, 30 C, 32 R, 32 B, 123/32 C, 32 E, 32 K, 32 L, 33 B, 33 C

[56] References Cited
UNITED STATES PATENTS

| | | | |
|---|---|---|---|
| 887,393 | 5/1908 | Haselwander | 123/32 R |
| 3,053,238 | 9/1962 | Meurer | 123/32 R |
| 640,083 | 12/1899 | Bickerton et al. | 123/32 R |
| 859,940 | 7/1907 | Gunther | 123/32 R |
| 1,345,723 | 7/1920 | Williams | 123/33 B |
| 1,273,834 | 7/1918 | Dumanois | 123/32 B |
| 1,750,403 | 3/1930 | Herkt | 123/32 R |
| 1,941,805 | 1/1934 | Lang | 123/32 R |
| 2,674,984 | 4/1954 | Bondi | 123/32 R |
| 2,692,586 | 10/1954 | Kamuit et al. | 123/32 R |
| 3,229,676 | 1/1966 | Ulbing | 123/32 R |

*Primary Examiner*—Laurence M. Goodridge
*Attorney, Agent, or Firm*—Roy T. Montgomery; William G. Lawler, Jr.

[57] ABSTRACT

An improved self-injection reciprocating diesel or stratified charge type engine which utilizes pressure in the cylinder to air inject fuel into an adjacent combustion chamber. The combustion chamber and the cylinder space are connected by three separate passages, a small fuel passage, a primary air passage, and a secondary air passage, the secondary air passage being smaller than the primary but considerably larger than the fuel passage. Fuel is delivered by pump pressure to the fuel passage well before top dead center of the piston. As the piston approaches top dead center, it blocks the primary air passage; the resulting rapid pressure increase in the cylinder over that in the combustion chamber causes air from the cylinder to flow through the secondary air passage and create a swirl in the combustion chamber, and air to flow through the fuel passage which atomizes part and ejects the remainder of the fuel onto the wall of the combustion chamber from where it evaporates and burns. The secondary air passage, subsequent to the blocking of the primary air passage, provides the flow path for most of the air flowing from the cylinder to the combustion chamber and hence, controls the pressure differential between the cylinder and combustion chamber. Because the fuel passage is substantially smaller than the secondary air passage, it may be cooled without excessive heat losses and at the same time prevent premature evaporation and decomposition of the fuel. This separation and function of the secondary air and fuel passages in combination with self-injection, swirl creation in the combustion chamber, initial atomization of a small fraction of the fuel, and surface deposition of most of the fuel followed by evaporation are the distinguishing features of this invention.

14 Claims, 12 Drawing Figures

INTERNAL COMBUSTION ENGINE

BACKGROUND OF THE INVENTION

This invention relates to internal combustion engines which use the compression within the cylinder space to provide timed injection of the fuel into a combustion chamber.

The use of the compression within the cylinder space to provide timed injection of the fuel has been proposed many times, and is generally accomplished by partially blocking off the combustion chamber from the cylinder space by motion of the piston and utilizing the resulting pressure increase in the cylinder space over that in the combustion chamber to feed fuel into the combustion chamber.

The advantages of adequate swirl inside the combustion volume of diesel engines has also long been recognized. Such swirl promotes more complete combustion, giving more power, less smoke, better efficiency and less combustion noise. Most of present day diesel engines are designed to provide such swirl.

The advantages of fuel injection onto the wall of a combustion chamber with a small amount of initial atomization together with adequate swirl in the combustion chamber so as to provide evaporation and mixing of the remaining fuel is described in the U.S. Pat. No. 2,907,308 to Siegfried Meurer and Hermann Seiglken.

SUMMARY OF THE INVENTION

In the present invention, an internal combustion engine of the reciprocal piston type utilizes the compression pressure in the cylinder to inject fuel into the combustion chamber. This is done by interconnecting the combustion chamber and the cylinder by means of a small fuel passage and two air passages, a primary air passage and a secondary air passage, the secondary passage being smaller than the primary. Fuel is deposited in the fuel passage well before top dead center of the piston. As the piston approaches top dead center, the piston blocks the primary air passage, the resulting rapid pressure increase in the cylinder over that in the combustion chamber causes the air in the cylinder to flow through the secondary air passage creating a swirl in the combustion chamber and air to flow through the fuel passage causing the fuel therein to be ejected into the combustion chamber.

In operation, fuel is deposited in the fuel passage through a check valve at a time in the cycle when the pressure in the cylinder space and the combustion chamber is low, such as the intake or scavenge portion of the cycle. At some pre-determined crank angle before top dead center, the primary air passage is blocked by the motion of the piston. The resulting pressure increase in the cylinder space over that in the combustion chamber forces air through the secondary air passage into the combustion chamber with a tangential component to impart a swirl in the combustion chamber. The pressure increase is also applied across the fuel passage which results in ejection of the fuel therein into the combustion chamber. The air swirl and its corresponding centrifuging action forces most of the fuel onto the wall of the combustion chamber from which it evaporates and is burned. A small portion of the fuel is atomized for initial ignition. Ignition may be by spark, compression or glow plug.

There are several important advantages to providing a self-inject on feature as in the present engine. First, since the fuel pump need not operate at high pressure and need not be accurately timed, the cost of injection pump can be very low. Thus, the present invention makes it practical to build smaller engines at a lower price. Second, because of the reduction of the complexity and precision of the pump, maintenance is greatly simplified and does not require special equipment or highly trained personnel. Third, since injection timing is determined by motion of the piston blocking the primary air passage, the timing is permanently built into the engine and never needs adjustment. Fourth, the combustion noise can be reduced to low levels, partly because the combustion chamber is substantially blocked from the cylinder space during the initial stages of combustion, and partly because of fuel injection onto the wall of the combustion chamber with a small amount of initial atomization together with adequate swirl in the combustion chamber so as to provide evaporation and mixing of the remaining fuel.

The novel feature of this invention is the provision of a combustion chamber which is interconnected with the cylinder space by a fuel passage and two air passages, the primary and secondary air passages, the primary being larger in area than the secondary. The fuel passage area is smaller than the secondary air passage area. Fuel is deposited in the fuel passage well before top dead center of the piston. As the piston approaches top dead center, the piston blocks the primary air passage, the resulting rapid pressure increase in the cylinder over that in the combustion chamber causes the fuel in the fuel passage to be ejected into the combustion chamber.

A further novel feature of this invention is the combination of the above feature with position, orientation and sizing of the secondary air passage such that adequate swirl is created in the combustion chamber so as to create smooth, efficient combustion.

Still another novel feature of this invention is the combination of the above features with the position, orientation and sizing of the fuel passage such that a small amount of the fuel is atomized for initial combustion while the majority of the fuel is deposited on the wall of the combustion chamber.

DESCRIPTION OF THE PREFERRED EMBODIMENTS

Figure 1:
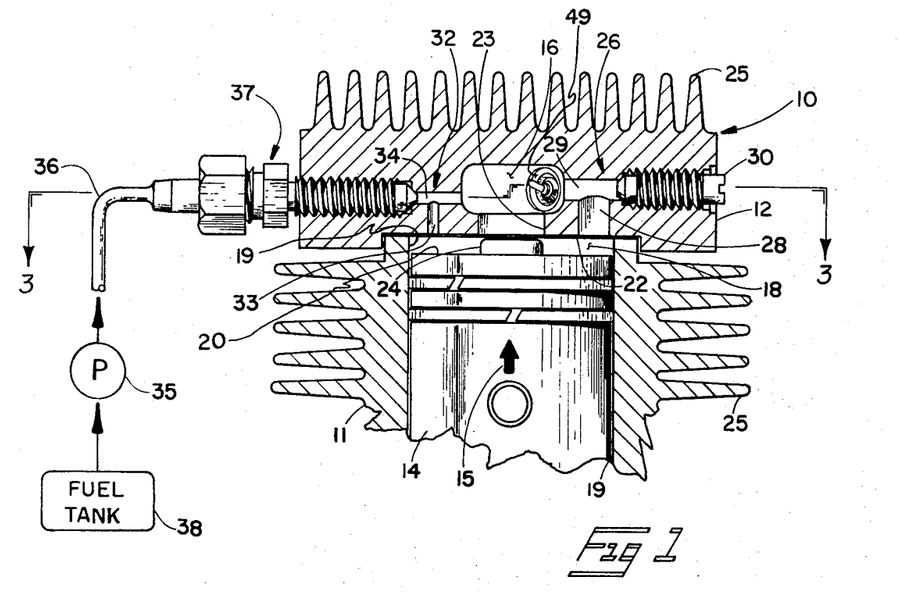
FIG. 1 is a schematic longitudinal section view of a cylinder head and piston of the engine of this invention, with the piston shown approaching the position where the primary air passage is blocked. For purposes of illustration, the cross-section through the combustion chamber shows the full diameter of the combustion chamber and is not quite a true cross-section.
Figure 2:
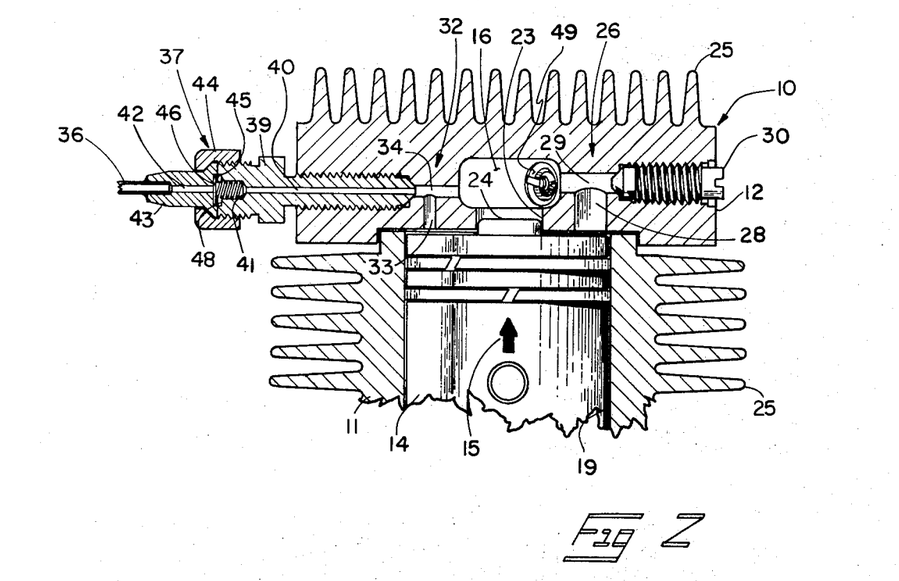
FIG. 2 is a view similar to FIG. 1 with the piston at top dead center position.
Figure 3:
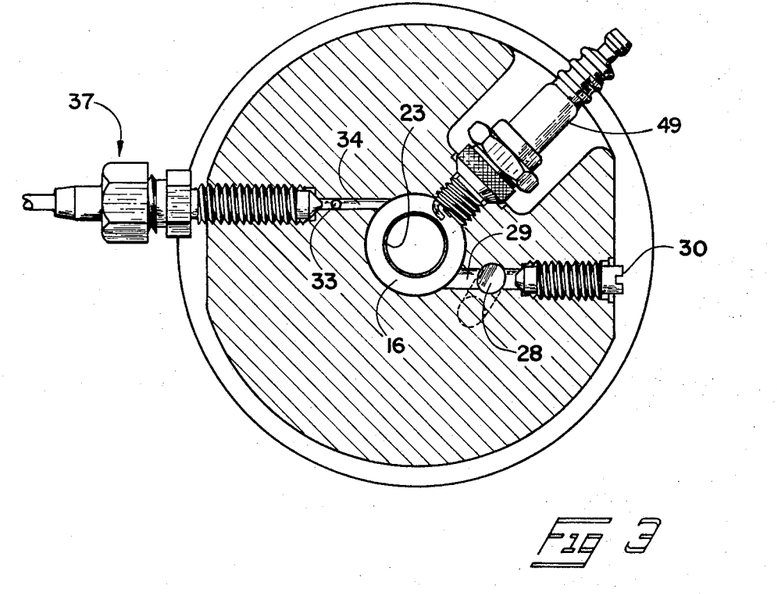
FIG. 3 is a transverse horizontal section view taken along line 3—3 of FIG. 1 but showing the secondary air passage and the fuel passage in true position.

Referring to the drawings and more particularly FIGS. 1–3, there is shown an air cooled, two-cycle, ported engine 10. Only the top part of the engine 10 is shown. The rest may be of workable design such as is well known in the art. The engine 10 may include one or more cylinder members 11 each having a head member 12 mounted thereon by some conventional means (not shown). A piston member 14 is carried in each cylinder 11 and is reciprocal along an axis 15. The head 12 has a combustion chamber 16 therein which is formed by a surface of revolution with an axis which is parallel with the axis of reciprocation 15. A cylinder space 18 is formed by the internal wall 19 of the cylinder 11, the top face 20 of the piston 14 and the internal surface 22 of the head 12. A primary air passage 23 is formed in the head 12 and interconnects the cylinder space 18 with the combustion chamber 16. The primary air passage 23 is circular in cross-section as shown best in FIG. 3. The primary air passage 23 is positioned for blockage as a result of piston motion. For example, in the embodiment of FIGS. 1–3, a cylindrical projection 24 is formed on the top face 20 of the piston 14 which is complimentary to the primary air passage 23 so that the projection 24 blocks the primary air passage 23 when the piston 14 nears top dead center. Both the combustion chamber 16 and the piston projection 24 are simple bodies of revolution coaxial with the cylinder 11, and are particularly easy to manufacture. However, other shapes and locations could be used without affecting the operation of the engine. Cooling fins 25 are formed on the external surfaces of both the cylinder 11 and the head 12.

A secondary air passage 26 smaller than the primary air passage 23 is formed in the head 12 and interconnects the cylinder space 18 and the combustion chamber 16. The secondary air passage 26 is formed of a first hole 28 extending from the cylinder space 18 upwardly at an angle with respect to the axis of reciprocation 15 (FIG. 3) and connecting to a smaller lateral second hole 29 which enters the combustion chamber 16. The lateral hole 29 enters the combustion chamber 16 generally tangential thereto such that air ejected therethrough into the combustion chamber 16 provides a swirling motion. The hole 29 is convenient to form by a conventional drilling operation from the outside of the head 12, which can then be tapped and plugged by a plug 30.

A fuel passage 32 is formed in the head 12 which also interconnects the cylinder space 18 with the combustion chamber 16. The fuel passage 32 is formed of a first vertical hole 33 which extends upwardly from the cylinder space 18 in a direction generally parallel with the axis of reciprocation 15 and which connects to a second lateral hole 34 which enters the combustion chamber 16. The hole 34 enters the combustion chamber generally tangential thereto and in a direction complimentary to the air swirl. The hole 34 is generally parallel to hole 29 and is shown entering the combustion chamber 16 at a different level with respect to the axis of the combustion chamber 16. Means are provided for depositing fuel in the fuel passage 32 at a time in the cycle when the internal pressures are relatively low. The means for depositing fuel include a fuel pump 35 which is connected to a source of fuel 38. Fuel is fed from the pump 35, through a supply tube 36, through a check valve 37, and into the hole 34.

The check valve 37 includes a body member 39 attached to the head 12. The body member 39 has a passage 40 therethrough in alignment with the hole 34 and a spring carrying recess 41 in the outside end. A second body member 43 having a passage 42 therethrough aligned generally with passage 40 is attached to a fuel supply tube 36 and is clamped into sealing engagement with body member 39 by a clamp nut 44 which threads onto the body 39. The body member 43 has a recess 45 in the inner face thereof in which is carried a thin valve closing plate 46. Valve 37 is normally held closed by the spring 47 acting against the plate 46. Slots 48 are provided in the outer face of valve body member 39 to allow free flow of fuel around valve plate 46 when the valve is open. Such a valve structure provides a very low inertia, rapid response valve.

The engine operation is as follows. Fuel is deposited in the fuel passage 32 during the exhaust or scavenging part of the cycle, or early in the compression stroke when the pressure in the engine is below that in the fuel line 36 and the check valve 37 opens. As the piston rises, projection 24 blocks the primary air passage 23 and the pressure in the cylinder space 18 rises more rapidly than the pressure in the combustion chamber 16. This pressure difference causes air to flow from the cylinder space 18 through the secondary air passage 26 and into the combustion chamber 16. The orientation of the air passage 26 with the combustion chamber 16 gives a swirl to the air in the combustion chamber 16. At the same time, this pressure difference between the cylinder space 18 and the combustion chamber 16 ejects fuel from the fuel passage 32 into the combustion chamber 16 in a direction complimentary to the swirling air. A small fraction of the fuel is atomized almost immediately and the remainder is swirled toward the wall of the combustion chamber 16 where much of it is deposited. The fuel deposited on the wall of the combustion chamber 16 is evaporated by heat from the combustion chamber wall and the swirling gases in the combustion chamber 16. A spark plug 49 may be used for ignition with the plug gap close to the wall of the combustion chamber 16. Ignition may also be by compression or glow plug.

The height of the piston projection 24 is predetermined so as to give correct timing for injection of the fuel into the combustion chamber 16. Satisfactory operation may be obtained for a range of piston projection heights but it is usually found that best results are obtained when the primary air passage 23 is blocked by the projection 24 at crank angles in the approximate range of 20° to 30° before top dead center.

As combustion occurs, and the piston 14 is moving down, gas will flow back through the secondary air passage 26 from the combustion chamber 16 into the cylinder space 18. The hole 28 of the secondary air passage 26 is angled (FIG. 3) with respect to the axis of reciprocation 15 so as to promote continued swirl in the cylinder space 18 as the gas flows from the combustion chamber 16 through the secondary air passage 26 into the cylinder space 18. This continuing swirl helps mix any unburned fuel with the unburned air in the cylinder space 18 and improves efficiency and power output. Angling of hole 28 is not essential as it is easier to form the hole 28 with its axis parallel with the axis 15 and this will normally give satisfactory performance.

The minimum cross-sectional area of the secondary air passage 26 which is the area of the hole 29, should be small enough to permit a sufficient pressure differential to develop difference between the cylinder space 18 and combustion chamber 16 so as to inject the fuel lying in the fuel passage 32 into the combustion chamber 16. Also, the velocity of the air issuing from the hole 29 into the combustion chamber 16 should be high enough to give adequate swirl in the combustion chamber 16 for efficient combustion. On the other hand, to maintain high efficiency, the maximum pressure difference at any instant between the cylinder space 18 and the combustion chamber 16 should never be greater than a small fraction of the pressure in the cylinder space 18. If the area of hole 29 is made too small, the pressure difference between the cylinder space 18 and combustion chamber 16 becomes excessive, leading to poor efficiency and overheating of the head 12. If the hole 29 is made too large, insufficient pressure difference is generated to inject the fuel into the combustion chamber 16 from fuel passage 32. By designing the engine so that at maximum engine speed the maximum pressure difference between the combustion chamber 16 and the cylinder space 18 is about one-tenth of the pressure in the cylinder space 18 at that time, satisfactory operation will be obtained over a wide speed range. With this pressure difference, the air velocity through hole 29 will reach several hundred feet per second.

The cross-sectional area of the fuel passage 32 and more particularly of hole 34 should be such that the fuel deposited therein is injected into the combustion chamber 16 prior to the piston 14 reaching top dead center. As the speed of the engine increases, the time available for injection decreases, resulting in the need for an increased pressure differential across fuel passage 32 to inject fuel before top dead center. This increased pressure difference is automatically provided since the maximum pressure difference between the cylinder space 18 and combustion chamber 16 due to the blocking of the primary air passage 23 by the piston projection 24 varies approximately as the square of the engine speed. Thus, it is possible to obtain satisfactory fuel injection over a wide speed range.

A primary purpose of the lateral hole 34 is to retain the fuel deposited therein until the primary air passage 23 is blocked by the projection 24. A small portion of the fuel may also enter the vertical hole 33. However, it is best that the area of hole 33 be small enough so that little or no fuel passes through hole 33 and into the cylinder space 18. Since the volume of the fuel injected per cycle is very small, the volume of the lateral hole 34 may also be quite small. It is also advantageous to make the complete fuel passage 32 as small as practical to enable sufficient cooling and avoid excessive evaporation of the deposited fuel. It has further been found that good performance results when the holes 33 and 34 are occuring in the same diameter. The minimum cross-sectional area of the fuel passage 32 should be less than one-half the minimum cross-sectional area occuring in the secondary air passage 26. Staying well within this parameter, it has been found that the fuel passage 32 can be sufficiently cooled to enable engine operation with such high-volatility fuels as gasoline.

Figure 4:
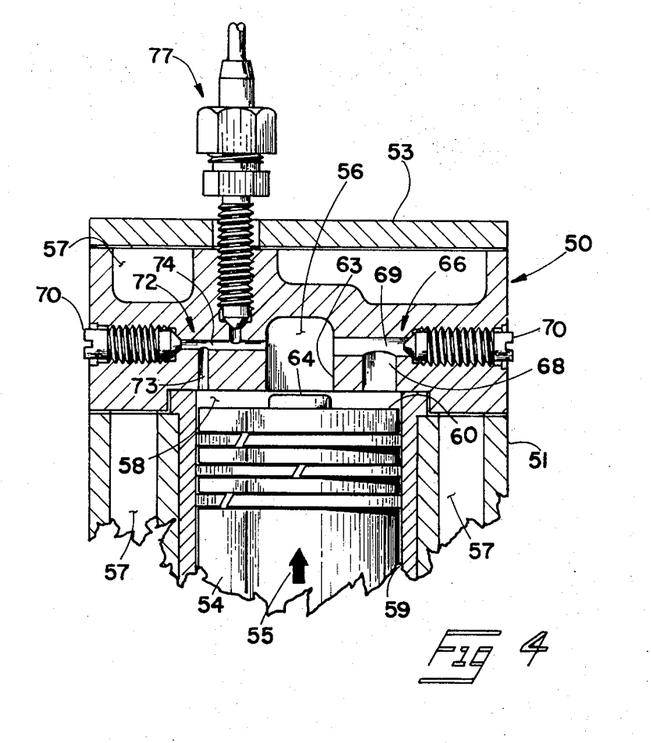
FIG. 4 is a view similar to FIG. 1 illustrating the invention as embodied in a liquid cooled engine with the fuel supply means entering the fuel passage perpendicularly thereto.

Referring to FIG. 4 there is shown a liquid cooled, two-cycle ported engine 50. The engine 50 includes one or more cylinder members 51 each having a head member 52 mounted thereon by some conventional means (not shown). There is also a head cover 53 mounted on the head 52 to form cooling passages 57 therebetween. Cooling passages 57 are also formed in the wall of the cylinder 51. The piston member 54 is carried in each cylinder 51 and is reciprocal therein along an axis 55. The head 52 has a combustion chamber 56 therein which is cylindrical in shape having an axis which is parallel with the axis of reciprocation 55. A cylinder space 58 is formed by the internal wall 59 of the cylinder 51, the top face 60 of the piston 54, and the internal surface 62 of the head 52. The primary air passage 63 interconnects the cylinder space 58 with the combustion chamber 56 and has the same diameter as the combustion chamber 56 which enables simplified machining of the combustion chamber 56 and the primary air passage 63. The primary air passage 63 is positioned to be blocked as a result of piston motion by the cylindrical projection 64 which is complimentary to the primary air passage 63. As a result, the projection 64 blocks the primary air passage 63 when the piston 54 nears top dead center position.

In the head 52 is formed a secondary air passage 66 which is smaller than the primary air passage 63 and which interconnects the cylinder space 58 and the combustion chamber 56. The secondary air passage 66 is formed of a first vertical hole 68 extending from the cylinder space 58 upwardly and connecting with a smaller lateral second hole 69 which enters the combustion chamber 56. The lateral hole 69 enters the combustion chamber 56 generally tangential thereto (as in the embodiment of FIG. 3) such that air injected into the combustion chamber 56 provides a swirling motion. The hole 69 is conveniently formed by a conventional drilling operation from the outside of the head 52. The hole 69 can then be tapped and plugged by a plug 70.

In the head 52 is also formed a fuel passage 72 which interconnects the cylinder space 58 with the combustion chamber 56. The fuel passage 72 is formed of a vertical hole 73 extending upwardly from the cylinder space 58 in a direction generally parallel with the axis of reciprocation 55 and connecting to a lateral second hole 74 which enters the combustion chamber 56. The hole 74 and the hole 69 enter the combustion chamber 56 tangential thereto as with hole 29 and 34 shown in FIG. 3 of the previous embodiment. However, the holes 69 and 74 are shown in FIG. 4 as entering the combustion chamber 56 at the same level with respect to the axis of the combustion chamber 56. Hole 74 may be conveniently drilled from outside the head 52 and then tapped and plugged by a plug 70. A check valve 77 is shown entering the head 52 from the top to supply fuel to the hole 74 from a source. The check valve 77 is preferably positioned to deposit fuel into the hole 74 generally perpendicularly thereto and at a point about half the distance from the hole 73 to the point of entry of the hole 74 into the combustion chamber 56. By depositing fuel perpendicular to hole 74, slightly better retention of the fuel in the hole 74 is obtained during the period between deposition and injection. The structure of the check valve 77 as well as the relative sizing of the passages and the mode of operation is similar to that of the embodiment shown in FIGS. 1–3.

Figure 5:
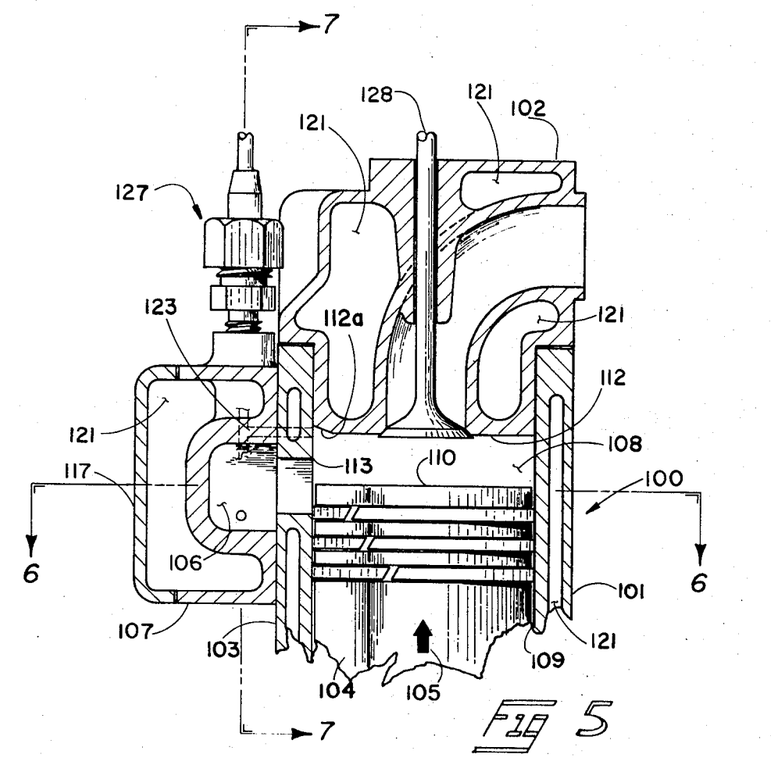
FIG. 5 is a view similar to FIG. 1 illustrating the invention with the combustion chamber in the cylinder wall.
Figure 6:
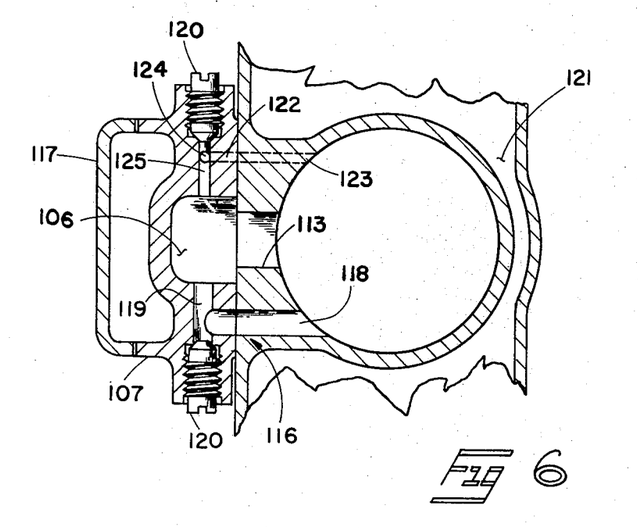
FIG. 6 is a transverse horizontal section taken along line 6—6 of FIG. 5. For purposes of illustration, the cross-section through the combustion chamber shows the full diameter of the combustion chamber and is not quite a true cross-section.
Figure 7:
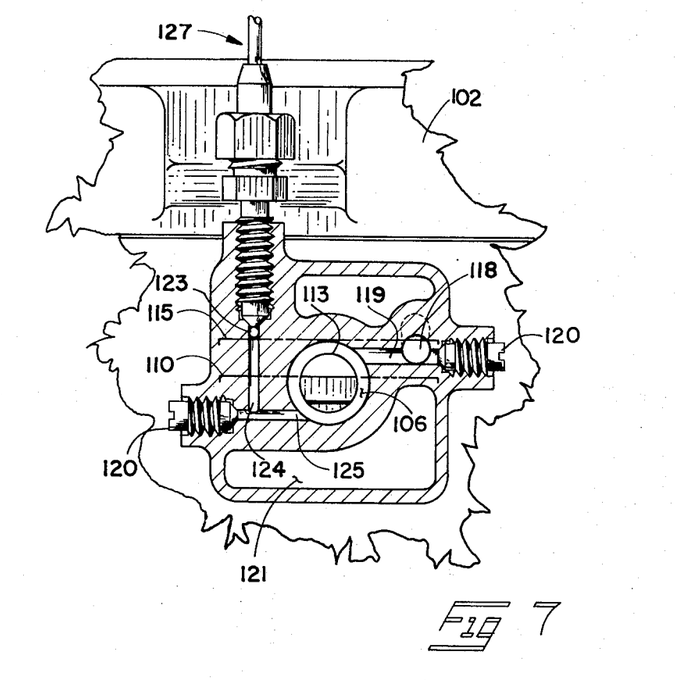
FIG. 7 is a longitudinal section view taken along line 7—7 of FIG. 5.

Referring to FIGS. 5–7 there is shown an engine 100 with an in-head valve or valves 128. The engine 100 includes one or more cylinder members 101, each having a head member 102 mounted thereon by some conventional means (not shown). A piston member 104 is carried in each cylinder 101 and is reciprocal along an axis 105. The cylinder member 101 includes a wall 103 with a block 107 mounted thereon. The block 107 has a combustion chamber 106 therein which is formed by a surface of revolution with an axis which is generally perpendicular to the axis of reciprocation 105. A cylinder space 108 is formed by the internal wall 109 of the cylinder 101, the top face 110 of piston 104, and the internal surface 112 on the head 102. A cover 117 is mounted on the block 107 to form cooling passages 121 therebetween. Cooling passages 121 are also formed in the head 102 and cylinder 101. A primary air passage 113 is formed in the cylinder 101 and interconnects the cylinder space 108 with the combustion chamber 106. The primary air passage 113 is circular in cross-section as shown best in FIG. 7. As the piston 104 approaches top dead center position, the cylindrical side of the piston 104 blocks the primary air passage 113.

A secondary air passage (FIG. 6) is formed in the block 107 and the cylinder 101 which is smaller than the primary air passage 113 and which interconnects the cylinder space 108 in the combustion chamber 106. The secondary air passage 116 is formed of a first hole 118 extending from the cylinder space 108 outwardly in a direction generally perpendicular to the axis of reciprocation 105 and connecting to a slightly smaller lateral second hole 119 which enters the combustion chamber 106. The hole 118 enters the cylinder space just above the point 115 at which the piston reaches at top dead center (FIG. 7). The internal surface 112 of the head 102 has a relieved portion 112a on one side (see FIG. 5) to ensure that holes 118 and 123 are always open to the cylinder space 108. The hole 119 enters the combustion chamber 106 generally tangential thereto such that air injected into the combustion chamber 106 provides a swirling motion. The hole 119 is convenient to form by a conventional drilling operation from the outside of the block 107. The hole 119 can then be tapped and plugged by a plug 120.

A fuel passage 122 is also formed in the block 107 and cylinder 101 and interconnects cylinder space 108 with combustion chamber 106. The fuel passage 122 is formed of a hole 123 extending outwardly from the cylinder space 108 in a direction generally perpendicular to the axis of reciprocation 105 and connecting to a vertical second hole 124. Hole 124 connects to a lateral third hole 125 which enters the combustion chamber 106 generally tangential thereto and complimentary to the air swirl. The hole 125 is generally parallel to hole 119 and enters the combustion chamber 106 at the same level with respect to the axis of combustion chamber 106. Means are provided for depositing fuel in the fuel passage 122 which are similar to the means described for the embodiment of FIGS. 1–3. Such means include a check valve 127 which is similar in construction to the check valve 37.

By providing a primary air passage 113 through the cylinder wall instead of the cylinder head, the engine can be conveniently provided with valve 128 if desirable. The operation of the embodiment of FIGS. 5–7 is similar to that of FIGS. 1–3. Fuel is deposited in hole 124 during the exhaust or scavenge part of the cycle. At a predetermined time before top dead center, the primary air passage 113 is blocked by the cylindrical side of the piston 104 increasing the pressure in the cylinder space 108 over that in the combustion chamber 106. This results in air being forced to a high-velocity through the secondary air passage 116 which in turn causes swirl in the combustion chamber 106. At the same time the higher pressure in the cylinder space 108 forces the fuel deposited in hole 124 into the combustion chamber 106.

Figure 8:
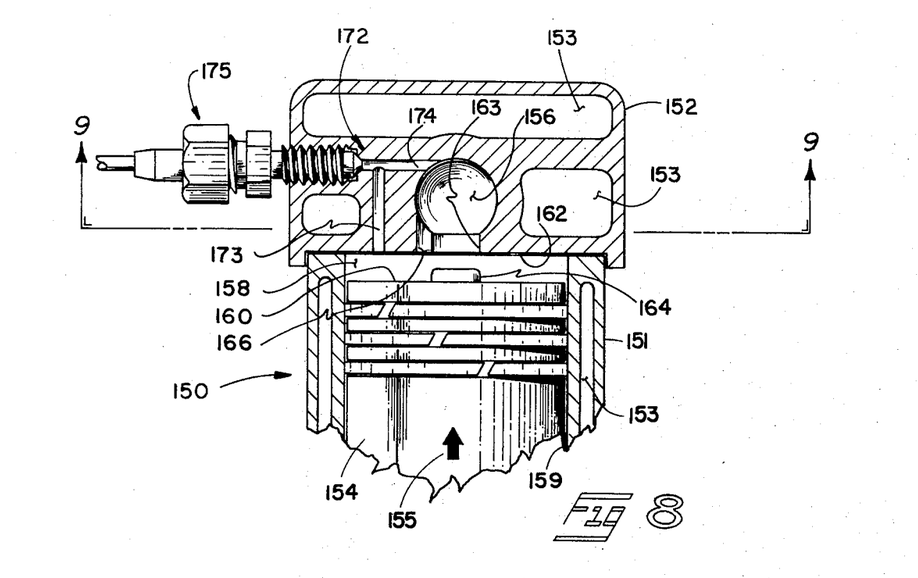
FIG. 8 is a view similar to FIG. 1 showing an alternate embodiment of the invention.
Figure 9:
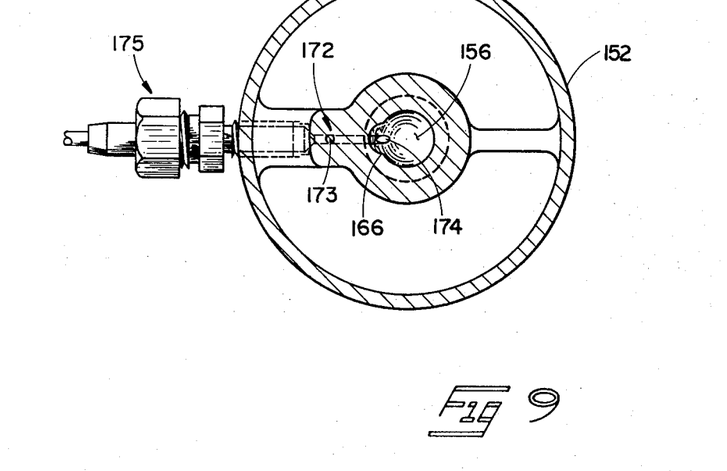
FIG. 9 is a sectional view taken along line 9—9 of FIG. 8.

The previously described embodiments have shown a secondary air passage which is completely separate from the primary air passage. Referring to FIGS. 8 and 9, an embodiment is shown with the primary air passage and the secondary air passage adjacent and in conjunction. The engine 150 includes one or more cylinder members 151, each having a head member 152 mounted thereon by some conventional means (not shown). Cooling passages 153 are formed in the head 152 and the cylinder 151 to provide passage of cooling fluid. A piston member 154 is carried in each cylinder 151 and is reciprocal along an axis 155. The head 152 has a combustion chamber 156 therein which is formed by a surface of revolution being generally spherical in shape. A cylinder space 158 is formed by the internal wall 159 of the cylinder 151, the top face 160 of the piston 154 and the internal surface 162 of the head 152. A primary air passage 163 is formed in the head 152 and interconnects the cylinder space 158 with the combustion chamber 156. The primary air passage 163 is circular in cross-section and is complimentary to the piston projection 164. As a result, when the piston approaches top dead center position, the primary air passage 163 is blocked by the projection 164.

A secondary air passage 166 is formed in the head 152 which is smaller than the primary air passage 163 and interconnects the cylinder space 158 and the combustion chamber 156. The secondary air passage 166 is formed adjacent to and in conjunction with the primary air passage 163 such that it is normally open to the primary air passage 163. The secondary air passage 166 enters the combustion chamber 156 generally tangential thereto such that air injected into the combustion chamber 156 provides a swirling motion.

A fuel passage 172 is also formed in the head 152 which interconnects the cylinder space 158 with the combustion chamber 156. The fuel passage 172 is formed of a vertical hole 173 extending upwardly from the cylinder space 158 in a direction generally parallel the axis of reciprocation 155 and connecting to a lateral second hole 174 which enters the combustion chamber 156 generally tangential thereto and in a direction complimentary to the air swirl. Means, as described in the embodiment of FIGS. 1–3, are provided for depositing fuel in the fuel passage 172 at a time in the cycle when the internal pressures are relatively low. Details of the mode of operation of this embodiment are similar to that of FIGS. 1–3 described previously.

In the embodiments shown in FIGS. 1–9, the orientation of the fuel passage into the combustion chamber should be carefully determined. For a compression ignition engine, if the fuel passage enters the combustion chamber so that at entrance the axis of the fuel passage is actually tangential to the surface of the combustion chamber, it is found that starting is difficult and, when running, ignition may be irregular or excessively delayed. On the other hand, if the fuel passage enters radially into the combustion chamber, excessively rapid combustion can cause objectional combustion noise and smoke. Each engine design should be carefully investigated to find the optimum entrance configuration of the fuel passage into the combustion chamber. It is often found that the best compromise is near tangential entrance of the fuel feed passage into the combustion chamber, as shown in the drawings.

Figure 10:
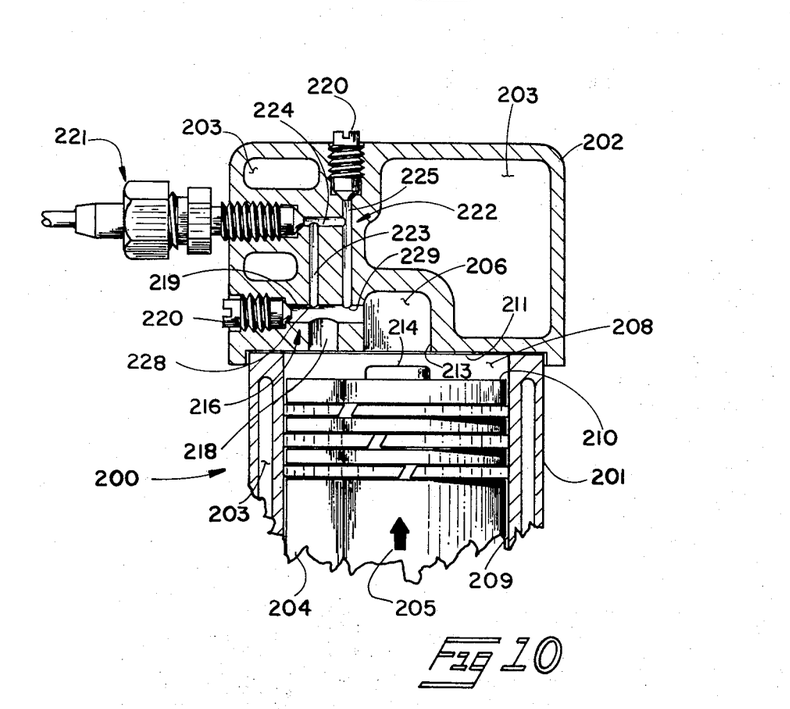
FIG. 10 is a view similar to FIG. 1 showing an alternate embodiment of the invention.

All of the previously described embodiments have had the fuel passage enter the combustion chamber directly. An alternate construction is to have the fuel passage enter the secondary air passage. Such an embodiment is shown in FIG. 10. There is shown an engine 200 having one or more cylinder members 201 each having a head member 202 mounted thereon by some conventional means (not shown). A piston member 204 is carried in each cylinder 201 and reciprocates along an axis 205. The head 202 has a combustion chamber 206 therein which may be formed as a surface of revolution having an axis which is parallel with the axis of reciprocation 205. A cylinder space 208 is formed by the internal wall 209 of the cylinder 201, the top face 210 of the piston 204 and the internal surface 212 of the head 202. A primary air passage 213 is formed in the head 202 and interconnects the cylinder space 208 with the combustion chamber 206. A cylindrical projection 214 is formed on the top face 210 of the piston 204 which is complimentary to the primary air passage 213 so that the projection 214 blocks the primary air passage 213 when the piston 204 nears top dead center. Cooling is provided by cooling fluid such as water flowing through passages 203 in the head 202 and cylinder 201.

A secondary air passage 216 is formed in the head 202 which is smaller than the primary air passage 213 and interconnects the cylinder space 208 and the combustion chamber 206. The secondary air passage 216 is formed of a first hole 218 extending from the cylinder space 208 upwardly generally parallel with the axis of reciprocation 205 and connecting to a smaller lateral second hole 219 which enters the combustion chamber 206. The lateral hole 219 enters the combustion chamber 206 generally tangential thereto such that air injected into the combustion chamber 206 provides a swirling motion.

A fuel passage 222 is also formed in the head 202 and interconnects one portion 228 of the hole 219 to a second portion 229. The fuel passage 222 is formed of a generally vertically hole 223 extending upwardly from the portion 228 in a direction generally parallel with the axis of reciprocation 205 and connecting to a second lateral hole 224. Hole 224 is connected to a third hole 225 which is generally parallel to the axis 205 and which connects to a portion 229 of hole 219. Means are provided for depositing fuel in the fuel passage 222 at a time in the cycle when the internal pressures are relatively low. Said means are similar to those described in the embodiment of FIGS. 1–3 and include a check valve 221.

The operation of the embodiment shown in FIG. 10 is as follows. At a pre-determined crank angle before the piston 204 reaches top dead center, the primary air passage 213 is blocked by the piston projection 214. Air is then forced through the secondary air passage 216. Since hole 218 of secondary air passage 216 is considerably larger in area than hole 219 and the effective area of passage 216 at the portion 218 is larger than the area at portion 229; consequently most of the pressure drop occuring across the secondary air passage 216 will occur between the inlet to hole 223 from hole 219 and the outlet from hole 225 into the hole 219. This pressure difference causes air to flow up hole 223, across hole 224 and down 225. This air ejects the previously deposited fuel from fuel passage 222 through hole 225 into hole 219. The air flowing through hole 219 carries the fuel into the combustion chamber 206. This alternative configuration for the fuel passage may also be used in constructions in which the combustion chamber is mounted on the cylinder wall as shown in FIGS. 5–7.

Figure 11:
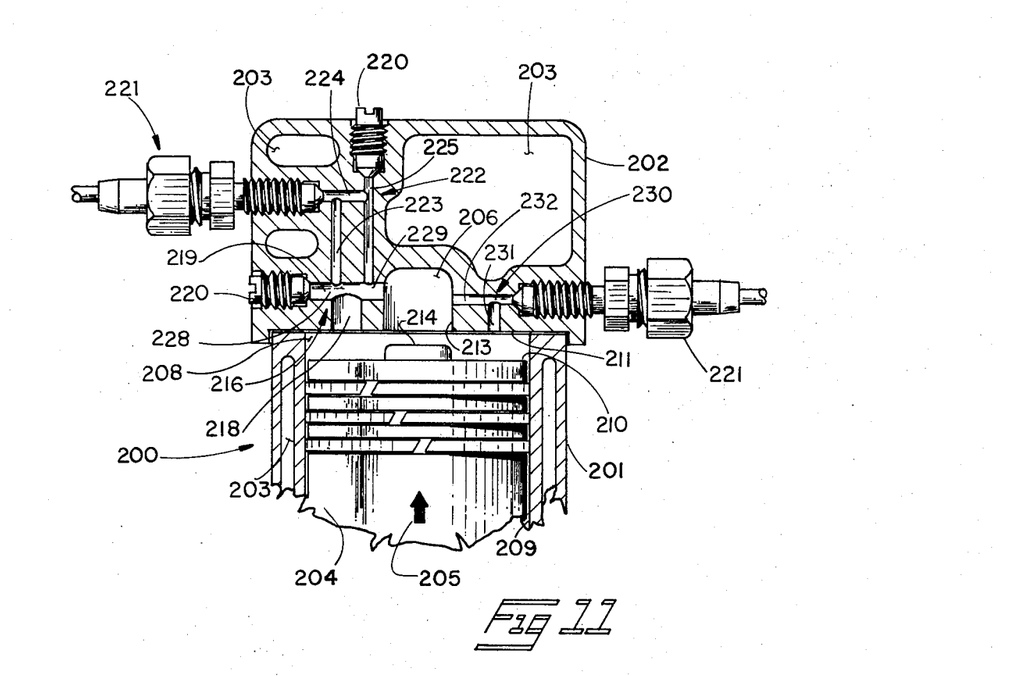
FIG. 11 is a view similar to FIG. 2 showing an alternate embodiment of the invention.

Referring to FIG. 11, there is shown an embodiment similar to FIG. 10 except a second fuel passage 230 is provided. The fuel passage 230 is formed in the head 202 and interconnects the cylinder space 208 with the combustion chamber 206. The fuel passage 230 is formed of a vertical hole 231 extending upwardly from the cylinder space 208 in a direction generally parallel with the axis of reciprocation 205 and connecting to a second lateral hole 232 which enters the combustion chamber 206 generally tangential thereto in a direction complimentary to the air swirl. The hole 232 is generally parallel to hole 219 and enters the combustion chamber 206 at a different level with respect to the axis of swirl. Means are provided for depositing fuel in the fuel passage 230 at a time in the cycle when the internal pressures are relatively low. Said means are similar to the means for the fuel passage 222. This embodiment has the advantage that by injecting most of the fuel directly onto the wall of the combustion chamber 206 through fuel passage 230, the fuel injected into the secondary air passage 216 ignites rapidly and promotes smooth combustion of the fuel injected directly into the combustion chamber 206. Such a combination gives easy starting and smooth combustion.

Figure 12:
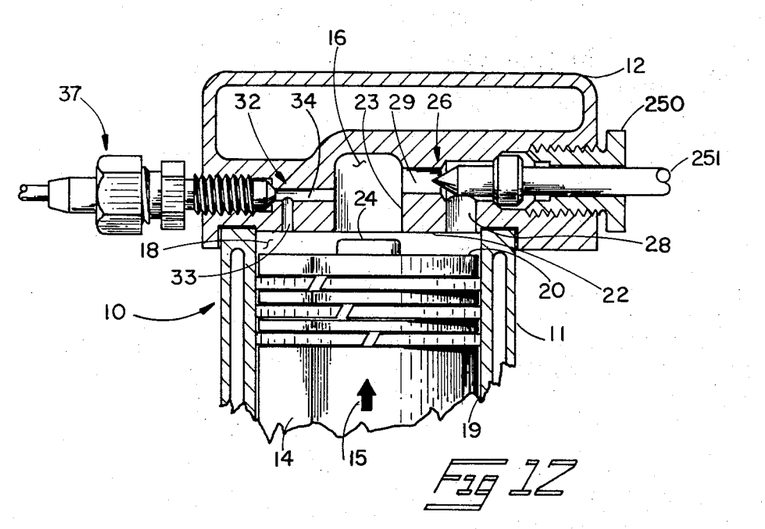
FIG. 12 is a view similar to FIG. 1 showing an alternate embodiment of the invention.

Referring to FIG. 12 there is shown an embodiment similar to FIGS. 1–3 except that an adjustable movable plug member 250 is provided in the lateral hole 29 of the secondary air passage 26. The adjustable element 251 of the plug 250 provides the means for constricting the air passage 26. By constricting the air passage at hole 29 as illustrated improvement may be obtained in starting and slow speed operation. For normal operation, the plug element 251 may be retracted out of the hole 29. Movement of the plug element 251 may be accomplished either manually or automatically.

When operated as a spark ignited engine, the steps leading to ignition and combustion are similar to those occuring in present day stratified charge engines. In the embodiments shown and described, the fuel is introduced into the combustion chamber in a generally tangential direction. In addition, the swirl inside the combustion chamber tends to centrifuge fuel droplets toward the combustion chamber wall. Thus, the fuel-air mixture is much richer near the combustion chamber wall than near the center of the combustion chamber. This stratification of the fuel enables ignition by means of a spark gap placed near the combustion chamber wall, even though the overall fuel-air ratio may not support ignition and combustion in a perfectly uniform mixture. This ability to burn a wide range of overall fuel-air ratios permits the elimination of a throttle in the air inlet, giving an efficient engine with low pollution in the exhaust products. It has been found that the engine can operate with spark ignition at high compression ratios without knock over a wide range of speed and load.

In the embodiment shown in FIG. 10, the fuel is atomized and burned more rapidly than in the other embodiments because the fuel is injected into an air stream. This high burning rate can be beneficial in a very high speed engine, but can also lead to objectional combustion noise and black smoke.

The chains of events leading to combustion in a compression ignition engine depends on the configuration and orientation of the various passages and on a number of design and operating variables. For the construction with a single fuel passage leading into the combustion chamber, as is shown in FIGS. 1–9, the chain of events leading to combustion depends on orientation of the fuel passage leading into the combustion chamber, and the temperature of the combustion chamber surface and the degree of swirl. With near radial injection of the fuel and moderate swirl, the fuel is well mixed with the air and combustion is similar to that occurring in most present day diesel engines. However, with near tangential injection of the fuel, a major portion of the fuel is deposited on the combustion chamber surface. At the same time, a minor portion of the injected fuel is thoroughly atomized by the flow of high velocity air through the fuel passage. This atomized fuel ignites rapidly and in turn ignites the remaining fuel as it is evaporated from the wall by the combined effects of heat from the combustion chamber surface, heat from the combustion chamber gases and the high swirl of the combustion chamber gases. This evaporation and the burning of the fuel is efficient, gives smooth operation and is highly desirable. However, care must be taken to avoid excessively high temperatures of the combustion chamber wall. If the temperature is too high, the fuel is decomposed on striking the combustion chamber wall which will lead to black smoke in the exhaust and excessive combustion noise. On the other hand, if the temperature of the combustion chamber wall is too low, combustion at low power outputs of the engine is delayed and may become irregular and incomplete leading to unburnt fuel in the exhaust and poor fuel consumption.

For the construction with a single fuel passage leading into the secondary air passage shown in FIG. 10, the mode of combustion changes in most cases. A larger fraction of the fuel is atomized by the high speed air flowing in the secondary air passage 219 and also by the swirling air in the combustion chamber 206, and less fuel is deposited on the combustion chamber wall for subsequent evaporation. This leads to more black smoke in the exhaust, more combustion noise and a lower maximum power output when compared to the construction with a separate fuel passage.

For the construction with two fuel passages shown in FIG. 11 with one entering the secondary air passage 216, a very desirable mode of combustion may be obtained by feeding into the fuel passage 222 connected into the secondary air passage 216 a quantity of fuel which is a minor portion of the fuel fed to the engine at maximum torque. The remainder of the fuel is fed into the fuel passage 229 leading directly into the combustion chamber 206. With this construction, the fuel entering the secondary air passage 216 self-ignites rapidly, and is then available for igniting the remainder of the fuel, most of which is deposited on the combustion chamber wall. This fuel deposited on the combustion chamber wall is then ignited by the previous combustion products. This construction can give more regular operation at low power and yet give smooth efficient operation at high power.

An engine has been built in general accordance with FIG. 4 which gives satisfactory performance. It has a bore of 3.15 inches, a stroke of 3.35 inches and gives an output of 12.5 brake horsepower at 3,000 revolutions per minute. The primary air passage and the combustion chamber are circular and 1.21 inches in diameter and are coaxial with each other and the axis of the cylinder. The depth of the combustion chamber from the internal wall of the head is .92 inches. The diameter of the lateral bore of the secondary air passage is .25 inches. The centerline of the lateral hole is offset from the axis of the combustion chamber by .42 inches. The diameter of the fuel passage is .094 inches and the lateral hole's centerline is parallel to and opposite from the lateral hole of the secondary air passage and is offset from the axis of the combustion chamber by .45 inches. Both lateral holes are spaced from the internal wall of the head by .56 inches. The height of the projection on the piston is .20 inches. The engine is water cooled and has an effective compression ratio of 17:1.

It has been found that care must be taken to avoid excessive noise in engines built according to this disclosure. Noise originating in the combustion chamber may be divided into two components, that due to very rapid rates of pressure rise and that due to accoustical resonant waves in the combustion chamber. In compression ignition engines, the combustion chamber pressure may increase at a rate of several hundred pounds per square inch per degree of crankshaft revolution, and is apparently due to the sudden ignition of previously vaporized and possibly decomposed fuel. The resultant pressure transient occurs over only a very small crank angle, but causes vibration of the engine structure. This pressure transient causes the characteristic diesel "knock." However, longer term accoustical resonance waves are also possible and are very similar to the "screeching" oscillations occurring in rocket chambers. With cylindrical combustion chambers such as shown in FIG. 4, both the radial and tangential modes of accoustical resonance waves have been observed, and it is probable that the longitudinal mode is also present. Wave amplitudes in excess of 100 pounds per square inch have been observed and the resultant combustion noise from the engine is very unpleasant to the human ear and gives the impression of very rough running.

The magnitude of the noise is influenced by the timing of fuel injection into the combustion chamber (which is determined by the crank angle at which the primary air passage is blocked by the piston), the temperature of the combustion chamber walls, the general combustion chamber shape and hole orientation, and the magnitude of the swirl inside the combustion chamber (which is influenced by the crank angle at which the primary air passage is blocked and the orientation of the secondary air passage inlet into the combustion chamber). It is generally found that the following changes reduce the magnitude of the noise:

1. Decreasing the crank angle before top dead center at which the primary air passage is blocked.
2. Decreasing the temperature of the combustion chamber wall, which may be accomplished by improved cooling.
3. Offsetting the secondary air hole and the fuel hole with respect to the axis of swirl, as shown in FIG. 1.

Very low swirl also tends to give high noise.

From the previous discussion it is clear that two of the most important design parameters of the engine are the crank angle at which the primary air passage is blocked and the area relationship of the primary and secondary air passages as defined above.

For compression ignition engines, satisfactory operation may be obtained for a range of injection timing, but it is usually found that best results are obtained when the primary air passage is blocked by the piston at crank angles in the approximate range of 20° to 30° before top dead center.

For spark ignition engines, injection may be earlier than for compression ignition engines, since spark timing and hence ignition can be independently varied.

A variety of fuel pumps may be used in conjunction with this invention. Positive displacement pumps with variable displacement are the most satisfactory technically for many engine applications. Since the fuel is deposited in the fuel passage when the cylinder pressure is low, the fuel pump may operate at low pressure. Hence the fuel pump may be simpler and cheaper than the fuel pumps for conventional diesel engines.

Positive displacement pumps with constant displacement may also be used by incorporating a variable bypass valve connecting the pump outlet to the pump inlet. Provided the check valve opening pressure is small compared with the pressure required to pump the fuel into the cylinder, for a given setting of the variable bypass valve, such an arrangement would deliver a quantity of fuel per cycle which would be only weakly dependent on engine speed. However, with this arrangement, it is difficult to maintain the check valve opening pressure small compared with the pressure required to pump the fuel into the cylinder at low speeds and low torque of the engine, and yet avoid excessively high pump pressures at high speeds and high torque of the engine. If the check valve opening pressure is not always small compared with the pump pressure, then the quantity of fuel per cycle delivered to the engine for a given setting of the bypass valve would decrease rapidly with decreasing engine speed once the check valve pressure becomes comparable with the pump pressure. This characteristic is most undesirable in the majority of applications. This undesirable characteristic may be reduced by boosting the pump inlet pressure as compared to the opening pressure of the check valve. Then the quantity of fuel per cycle delivered to the engine for a given setting of the bypass valve would be almost independent of the engine speed.

An alternative method of using a positive displacement pump with constant displacement is to incorporate a variable speed drive between the pump and the engine. Such an arrangement would have characteristics similar to those of a positive displacement pump with variable displacement.

Dynamic pumps such as centrifugal pumps, may also be used, again with a variable bypass valve across the pump. Except for low speed laminar flow, the flow rate through a pipe or orifice varies approximately as the square root of the pressure. However, the head of a dynamic pump varies approximately as the square of the speed, and thus for fixed orifices and valve settings, the fuel rate would vary almost linearly with speed provided that the check valve opening pressure is small compared with the pump pressure. It is even more difficult to maintain the check valve opening pressure small compared with the pressure of a dynamic pump over a wide speed range than is the case with a positive displacement pump because of the difficulty of obtaining high pressures in small dynamic pumps. However, the undesirable characteristics associated with the check valve opening pressure being comparable with the pump pressure may again be eliminated by boosting the inlet pressure of the dynamic pump to a pressure equal to that required to open the check valve.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. In a reciprocating internal combustion engine of the self-injection diesel type including,
   a cylinder comprising a cylinder and a piston adapted for reciprocal movement therein,
   a generally circular combustion chamber adjacent to said cylinder,
   a primary air passage connecting said chamber and said cylinder,
   means for blocking said primary air passage when the piston reaches a pre-determined position from top dead center,
   a fuel passage communicating with said cylinder and combustion chamber through which fuel is injected into said combustion chamber,
   means for depositing fuel in said fuel passage, and
   means for creating an air swirl in said combustion chamber,
   an improvement comprising,
   a secondary air passage larger than and separate from said fuel passage and oriented to create a swirl in said combustion chamber in response to an increase in pressure in said cylinder after the blockage of said primary air passage, and wherein
   said fuel depositing means comprises means for pumping fuel under pressure into said fuel passage during a period of low pressure within the cylinder, said fuel passage is oriented so that the fuel therein is air injected therefrom in response to an increase in pressure in said cylinder after blockage of said primary air passage substantially tangentially onto a generally circular wall of said combustion chamber and complimentary to the direction of said air swirl, such that a part of said fuel is atomized to provide a mixture for ignition and the remainder is deposited on the wall of the chamber from where it evaporates and burns, said fuel passage being separate from and substantially smaller than said secondary passage so as to enable sufficient cooling of the fuel passage and avoid excessive evaporation of fuel therefrom.

2. The engine of claim 1, wherein ignition of the fuel is by compression.

3. The engine of claim 1, wherein said fuel depositing means comprises means to deposit fuel in said fuel passage at a time when said primary air passage is open.

4. The engine of claim 1 further including means for igniting the atomized portion of said fuel upon entry thereof into said combustion chamber.

5. The engine of claim 1, further comprising means for varying the cross-sectional area of said secondary air passage whereby the pressure differential across said secondary air passage may be controlled.

6. The engine of claim 1, in which ignition is by spark.

7. The engine of claim 3 wherein said means for depositing fuel in said fuel passage include a fuel supply, a positive displacement pump and a check valve interposed between the fuel supply and the fuel passage.

8. The engine of claim 1, further comprising a second fuel passage the ends of which are connected to separated portions of said secondary air passage such that fuel deposited in said second fuel passage is ejected into said secondary air passage and into said combustion chamber as a result of said pressure increase, and said engine further comprises means for depositing fuel in said second fuel passage.

9. The engine of claim 1, wherein the primary and secondary air passages are in conjunction and said secondary air passage is completed upon blockage of the primary air passage when the piston reaches said predetermined position.

10. The engine of claim 1, in which the combustion chamber and the primary air passage are a continuous cylindrical shape.

11. The engine of claim 1 wherein said fuel depositing means is responsive to air pressure within said fuel passage, such that fuel is deposited within said fuel passage when the pressure therein falls below the pressure of said fuel depositing means.

12. The device of claim 1 wherein said secondary and fuel passages together are sized to produce a maximum pressure differential between said combustion chamber and said cylinder of approximately 10 percent at maximum engine speed.

13. The device of claim 12, wherein the minimum cross-sectional area occurring within said fuel passage is less than one-half the minimum cross-sectional area occurring within the secondary air passage.

14. In a diesel type reciprocating engine including, a cylinder, a piston within said cylinder and forming therewith an enclosed space, a combustion chamber apart from said cylinder, a primary air passage connecting said cylinder and said combustion chamber and means for substantially closing said primary air passage when said piston is within a pre-selected range of top dead center; means for providing a fuel mixture within said combustion chamber comprising, a secondary air passage between said cylinder space and said combustion chamber, a fuel passage one end of which opens into said secondary air passage at a first point, and the other end of which opens into said secondary air passage at a second point, said first point being larger in cross-sectional area and closer to said cylinder space than said second point, such that fuel deposited in said fuel passage is ejected into said secondary air passage by pressure differential between said first and second points, for depositing fuel in said fuel passage while said primary air passage is open, said secondary air passage being substantially larger than said fuel passage, and said secondary air passage discharging into said combustion chamber so as to create a swirl therein subsequent to closure of said primary air passage.

* * * * *